United States Patent [19]

Magid et al.

[11] Patent Number: 4,755,316

[45] Date of Patent: Jul. 5, 1988

[54] REFRIGERATION LUBRICANTS

[75] Inventors: Hillel Magid, Williamsville; Raymond Thomas, North Tonawanda; Leonard Stiel, Malverne; John W. Pelava, Buffalo, all of N.Y.

[73] Assignee: Allied-Signal Inc., Morris Township, Morris County, N.J.

[21] Appl. No.: 111,745

[22] Filed: Oct. 23, 1987

[51] Int. Cl.$^4$ .................. C09K 5/04; C10M 107/34
[52] U.S. Cl. ................... 252/68; 252/52 A; 252/67; 62/114
[58] Field of Search .............. 252/52 A, 67, 68; 62/114

[56] References Cited

U.S. PATENT DOCUMENTS

| | | | |
|---|---|---|---|
| 4,248,726 | 12/1981 | Uchinuma et al. | 252/68 |
| 4,267,064 | 5/1981 | Sasaki et al. | 252/52 |
| 4,428,854 | 1/1984 | Enjo et al. | 252/69 |
| 4,431,557 | 2/1984 | Shimizu et al. | 252/52 |
| 4,452,712 | 6/1984 | Laemmle | 252/52 A |
| 4,454,052 | 6/1984 | Shoji et al. | 252/68 |

FOREIGN PATENT DOCUMENTS 51795 3/1982 Japan.

OTHER PUBLICATIONS

1980 Ashrae Systems Handbook, pp. 32.4 and 32.10.
"Fundamentals of Lubrication in Refrigerating Systems and Heat Pumps"; H. H. Kruse and M. Schroeder—Ashrae Transactions, vol. 90, Part 2B, pp. 763–783, 1984.
"Evaluation of Lubricants for Refrigeration and Air--Conditioning Compressors"; H. O. Spauschus, Ashrae Transactions, vol. 90, Part 2B, pp. 784–798.
Research Disclosure 17483, Oct. 1978.
"A Review of Synthetic Oils for Refrigeration Use"; K. S. Sanvordenker and M. W. Larime, Ashrae Symposium, Nassau, Jun. 29, 1972.

Primary Examiner—Robert Wax
Attorney, Agent, or Firm—Jay P. Friedenson; Harold N. Wells

[57] ABSTRACT

Compression refrigeration equipment using tetrafluoroethane as a working fluid employs polyoxyalkylene glycols which are at least difunctional with respect to hydroxyl groups and a molecular weight between 300 and 2000. The mixtures of the glycols with the refrigerant will be miscible in the range from $-40°$ C. to at least $+20°$ C.

24 Claims, No Drawings

REFRIGERATION LUBRICANTS

DESCRIPTION

1. Field of the Invention

The invention relates generally to lubricants used with refrigerants. More particularly, it relates to lubricants for use with tetrafluoroethane, preferably R134a (1,1,1,2-tetrafluoroethane), a refrigerant which may replace R-12 in many applications as a result of environmental concerns.

2. Prior Art

R134a has been mentioned as a possible replacement for R12 (dichlorodifluoromethane) because of concern over potential depletion of the ozone layer. Much of the R12 is used in closed loop refrigeration systems and a large fraction of those are automotive air-conditioning systems. R134a has properties similar to those of R12, making it possible to substitute R134a with minimal changes in equipment being required. Its symmetrical isomer R134 (1,1,2,2-tetrafluoroethane) is similar and may also be used. Consequently, it should be understood that in the following discussion, "tetrafluoroethane" will refer to both R134 and R134a.

There is a unique problem which arises in such a substitution. Refrigeration systems which use R-12 generally use mineral oils to lubricate the compressor (the present discussion does not apply to absorption refrigeration equipment). See for example the discussion in chapter 32 of the 1980 ASHRAE Systems Handbook. R-12 is completely miscible with such oils throughout the entire range of refrigeration system temperatures, which may range from about −50° F. to 150° F. (−45.6° to 65.6° C.). Consequently, oil which dissolves in the refrigerant travels around the refrigeration loop and generally returns with the refrigerant to the compressor. It does not separate during condensation, although it may accumulate because of the low temperatures when the refrigerant is evaporated. At the same time, the oil which lubricates the compressor contains some refrigerant which may affect its lubricating property.

R134a is not miscible with mineral oils and consequently, different lubricants will be required. However, as mentioned above, no changes to equipment should be necessary when the refrigerant substitution is made. If the lubricant separates from the refrigerant it would be expected that serious operating problems could result. For example, the compressor could be inadequately lubricated if refrigerant replaces the lubricant. Significant problems in other equipment also could result if a lubricant phase separates from the refrigerant during condensation, expansion or evaporation. These problems are expected to be most serious in automotive air-conditioning systems because the compressors are not separately lubricated and a mixture of refrigerant and lubricant circulates throughout the entire system.

These problems have been recognized generally in the refrigeration art. Two recent publications by ASHRAE suggest that separation of lubricants and refrigerants can present problems, although no mention is made of R134a. These are "Fundamentals of Lubrication in Refrigerating Systems and Heat Pumps". H. H Kruse and M. Schroeder ASHRAE TRANSACTIONS, Vol 90, Part 2B, pages 763–782, 1984 and "Evaluation of Lubricants for Refrigeration and Air-Conditioning Compressors", H. O. Spauschus ibid, pages 784–798.

The following discussion will be more readily understood if the mutual solubility of refrigerants and various lubricating oils is considered in general, with specific reference to R134a. Small amounts of lubricants may be soluble in R134a over a wide range of temperatures, but as the concentration of the lubricant increases the temperature range over which complete miscibility (i.e. only one liquid phase is present) occurs narrows substantially. For any composition there may be two consolute temperatures, i.e. a lower and a higher temperature. That is, a relatively low temperature below which two distinct liquid phases are present and above which the two phases become miscible and a higher temperature at which the single phase disappears and two phases appear again. A diagram of such a system for R502 refrigerant is shown as FIG. 2 in the Kruse et al. paper mentioned above. There is a range of temperatures where one phase is present and, while it would be desirable that a refrigeration system operate within such a range, it has been found that for typical compositions the miscible range of lubricants with R134a is not wide enough to encompass the typical refrigeration temperatures.

There have been some disclosures which are concerned with the choice of lubricants when R134a is used as a refrigerant. Polyalkylene glycols were suggested to be used in a Research Disclosure by DuPont (17483 October 1978). Specific reference was made to such oils produced by Union Carbide Corporation under the trade names "Ulcon" (sic) LB-165 and Ucon 525. It is stated that these oils are miscible in all proportions with R134a at temperatures at least as low as −50° C. As will be discussed further below, the present inventors have found that the Union Carbide polyalkylene glycol oils are not fully miscible and in fact would be expected to form two phase mixtures at some locations in refrigeration systems and particularly in automotive air-conditioning systems.

It is believed that LB-165 and LB-525 are polyoxypropylene glycols which have a hydroxy group at one end of each molecule and a n-butyl group at the other end. Consequently, they are members of a particular class of mono-functional glycols. As will be seen, the present inventors have found that certain members of a related class having at least two hydroxyl groups (i.e. difunctional) provide an unexpectedly wider range of miscible mixtures with R134a.

Unfortunately, the term "poly glycols" has been given a different meaning than the word "glycol" would imply. The use of synthetic oils for refrigeration systems, including polyoxyalkylene glycols, is discussed by Sanvordenker and Larime in a paper given at an ASHRAE Symposium, Nassau, June 29, 1972. The authors make the point that poly glycols should properly be called ethers and esters rather than glycols because the terminal hydroxyl groups are bound by ester or ether groups. They state that this substitution makes them suitable for lubrication. This means that such glycol-based esters and ethers should be distinguished from poly glycols which are not so terminated. The present invention relates to compounds which are multifunctional with respect to hydroxyl groups and thus may be said to be true glycols.

U.S. Pat. No. 4,428,854 discloses the use of R134a as an absorption refrigerant where organic solvents are used as absorbing agent. Many of these are completely different from the lubricants of the present invention but one is generically related, namely tetramethylene glycol dimethyl ether, which has a much lower molecular weight and would not be expected to be useful as a lubricant in compression refrigeration systems. A related patent U.S. Pat. No. 4,454,052 also discloses polyethylene glycol methyl ether used as an absorbent along with certain stabilizing materials.

U.S. Pat. No. 4,431,557 relates to additives used in synthetic oils. Many refrigerants were mentioned, but tetrafluoroethane was omitted, and the patentees gave no indication of a concern with miscibility of the refrigerants and the lubricants.

The patentees in U.S. Pat. No. 4,267,064 also recommended the use of polyglycol oils, particularly for rotary compressors but they indicated the viscosities in the range of 25–50 centistokes (CS) at 98.9° C. were needed plus a viscosity index greater than 150. The generic formula could include oils having two hydroxyl groups but the text suggests that the patentees did not distinguish between various classes of the polyalkylene glycols. Their emphasis was principally in the use of certain additives. Although various refrigerants were listed, tetrafluoroethanes were omitted, suggesting the patentees did not recognize the problems with which the present inventors have been concerned.

Japanese published application No. 51795 of 1982 relates to antioxidants and corrosion inhibitors for use with various polyether type synthetic oils. The tests were carried out with R-12, which does not exhibit the immiscible character of R134a.

SUMMARY OF THE INVENTION

Compression refrigeration equipment using tetrafluoroethane, particularly R134a (1,1,1,2-tetrafluoroethane) as a working fluid may employ certain polyoxyalkylene glycols as lubricating oils to obtain an advantageous range of miscibility. The glycols may be polyoxypropylene glycols which should contain at least 80% oxypropylene units relative to the total. Polyoxypropylene glycol is preferred, alone or in admixture. Blends of such glycols which achieve the desired viscosity and range of miscibility with the refrigerant may also be used. The glycols will be at least difunctional with respect to hydroxyl groups, i.e. not ether or ester derivatives, which results in improved miscibility with the refrigerant. Glycols according to the invention will have a molecular weight between 300 and 2000. The viscosity will be about 25–150 centistokes at 37° C. and the viscosity index at least 20. Mixtures of such glycols with the refrigerant will be miscible in the range of −40° C. to at least +20° C., preferably at least +30° C., more preferably at least +40° C., most preferably +50° C. or higher. The weight ratio of refrigerant to the glycol lubricant will be in the range 99/1 to 1/99, preferably 99/1 to 70/30.

DESCRIPTION OF THE PREFERRED EMBODIMENTS

Refrigerants

The invention relates to the substitution of tetrafluoroethane, particularly R134a (1,1,1,2-tetrafluoroethane) for R-12 (dichlorodifluoro-methane), which has been considered to present a danger to the atmospheric ozone layer. R134a has physical characteristics which allow its substitution for R-12 with only a minimum of equipment changes, although it is more expensive and not available in large quantities at the present time. Its symmetrical isomer, R134, (1,1,2,2-tetrafluoroethane) may also be used. The effect of tetrafluoroethane on atmospheric ozone is considered to be much less than R-12 and therefore the substitution of tetrafluoroethane for R-12 is considered probable. Tetrafluoroethane could be blended with other refrigerants. including R-12, and for purposes of the present invention such blends are not excluded. However, it should be understood that included are only those blends of tetrafluoroethane with other refrigerants which are miscible with the lubricants of the invention in the range of −40° to at least +20° C.

R-12 is used in very large quantities and of the total a substantial fraction is used for automotive air conditioning. Consequently, the investigation of the lubricants needed for use with R134a (or R134) has emphasized the requirements of automotive air conditioning since the temperature range is generally higher than other refrigeration systems, being about 32° F. to 200° F. (0° C. to 93° C.). Since it has been found that R134a differs in being much less miscible with common lubricants than R-12, the substitutions of refrigerants becomes more difficult.

Lubricants

R-12 is fully miscible in ordinary mineral oils and consequently separation of the lubricants is not a problem. Although it is similar to R12, R134a is relatively immiscible in many lubricants as will be seen. Thus, it is necessary to find suitable lubricants which are miscible with R134a (or R134) to avoid refrigerant and lubricant separation.

It is characteristic of some refrigerant-lubricant mixtures that there is a temperature above which the lubricant separates. Since this phenomenon occurs also at some low temperature, there may be a limited range of temperatures within which the two fluids are miscible. Ideally, this range should span the operating temperature range in which the refrigerant is to operate, but often this is not possible. It is typical of automotive air conditioning systems that a significant fraction of the circulating charge is lubricant and the refrigerant and lubricant circulate together through the system. Separation of the lubricant and refrigerant as they return to the compressor could result in erratic lubrication of the moving parts and premature failure. Other types of air conditioning systems usually circulate only the relatively smaller amount of lubricant which is carried by the refrigerant gas passing through the compressor and should be less sensitive to the separation problem. Especially with automotive air conditioning, separation of the relatively large amount of lubricant circulating with the refrigerant can also affect the performance of other parts of the system. In a typical automotive air conditioning system, the temperatures at which the refrigerant is condensed originally will be about 50°–70° C. but may reach 90° C. in high ambient temperature operation. The condensation of hot refrigerant gases in the condensing heat exchanger can be affected if the exchanger is coated with lubricant preferentially so that condensation of the refrigerant occurs by contact with the lubricant film. Thereafter, the two-phase mixture of lubricant and refrigerant must pass through a pressure reduction to the low temperature stage where the refrigerant evaporates and absorbs the heat given up in cooling air and condensing moisture. If lubricant separates at the condenser, then the performance of the evaporator stage can be affected if separate phases persist as the two-phase mixture passes through the pressure reduction step. As with the condenser, accumulation of lubricant on the evaporator coils can affect heat exchange efficiency In addition, the low evaporator temperatures may result in excessive cooling of the lubricant resulting in a more viscous liquid and trapping of the lubricant in the evaporator. These problems can be avoided if the lubricant and the refrigerant are fully miscible throughout the operating temperature ranges, as was true with R-12 and mineral oil mixtures. R134a, with its limited ability to dissolve lubricants, presents a problem which must be solved.

The Union Carbide polyalkylene glycol ether LB-525, specifically mentioned in the DuPont Research Disclosure has been found to be immiscible at above about +5° C. with R134a although the disclosure states that the two fluids are miscible in all compositions at temperatures at least as low as −50° C. Practically, this means that such lubricants are not miscible with R134a over most of the temperature range used in automotive air conditioning. For such use the miscible range should be from −40° C. to at least +50° C. or higher, above 90° C. if possible. More generally, the miscible range should be between about −40° C. and at least +20° C., preferably at least +30° C., more preferably at least +40° C. It is particularly important that two phases not be present during starting of the compressor since inadequate lubrication is likely, leading to premature compressor failure.

The present invention relates to the applicants discovery that polyalkylene glycols which have at least dual hydroxy functionality have significantly wider ranges of miscibility with R134a and consequently they are superior to the mono functional glycols suggested by DuPont. Such glycols should operate without separation from R134a over much of the operating temperature range. Any separation which does occur would preferably be at the higher temperatures and thus would affect the condenser rather than the lower temperature evaporator.

The range of miscibility is not the only factor to be considered when one is selecting a lubricant for automotive air conditioning service (or other refrigeration applications). Lubricating properties also must be satisfactory for the intended application. Practically, this means that for automotive air conditioning the viscosity of the lubricant will be about 25-150 centistokes, preferably about 100 centistokes (CS) at 37° C. with a viscosity index of at least 20 in order that the lubricant is sufficiently viscous at high temperatures to lubricate while remaining sufficiently fluid to circulate around the refrigeration circuit at low temperatures. The range of viscosity may also be expressed as about 3-24 CS at 98.9° C. In addition, the lubricant should be chemically stable and not cause corrosion or other problems in long-term service. Other factors which should be considered in selecting lubricants are compatibility, lubricity, safety, and the like.

The inventors have found that certain polyalkylene glycols having at least dual hydroxy functionality (that is, they are truly glycols, not esters or ethers) are particularly useful as lubricants with R134a. They should not be derived solely from ethylene oxide repeating units since these have been found to have limited miscibility. This has also been found true for poly 1,2-oxybutylene glycols. Such materials would not be useful except in small amounts which did not seriously narrow the range of miscibility with R134a. Surprisingly, polyoxypropylene glycols have been found to be miscible with R134a over a satisfactory range, as will be seen below. Accordingly, polyoxypropylene glycols having at least two hydroxyl groups are preferred. More generally, the polyoxypropylene glycols should have propylene oxide units as at least 80% of the repeating units. The remaining 20% may be ethylene oxide or butylene oxide or other such as esters, olefins, and the like which may be polymerized with propylene oxide.

EXAMPLE 1

The miscibility of various potential lubricant oils is determined by combining them with refrigerant in glass tubes and observing the results when the tubes were maintained at a series of preselected temperatures. A tube is filled with the desired amount of oil and then refrigerant is added while the oil is frozen with liquid nitrogen. The tube is then sealed and immersed in a thermostat-controlled bath. After the temperature has equilibrated, the miscibility of the oil and refrigerant is determined by visual observation. The results of a series of tests made with R134a and polyalkylene glycols having dual hydroxy functionality are given in Table A below.

TABLE A

|  | Visc. @ 37° C. (Centistokes) | Mol Wt. | Wt % 134a | Miscibility Range |
|---|---|---|---|---|
| Difunctional PolyOxyPropyleneGlycols | | | | |
| NIAX 425 (1) | 33 | 450 | 90 | −60° C. to over 75° C. |
| NIAX 425 (1) | 33 | 450 | 50 | −30° C. to over 50° C. |
| NIAX 1025 (1) | 77 | 1000 | 90 | −60° C. to over 67° C. |
| NIAX 1025 (1) | 77 | 1000 | 50 | −60° C. to over 40° C. |
| PPG - 1200 (2) | 91 | 1200 | 90 | −60° C. to 55° C. |
| PPG - 1200 (2) | 91 | 1200 | 50 | −60° C. to over 80° C. |
| PPG - 2000 (2) | 165 | 2000 | 85 | −60° C. to 13° C. |
| PPG - 2000 (2) | 165 | 2000 | 50 | −30° C. to 43° C. |
| Difunctional PolyOxyEthylene Glycols | | | | |
| Pluradot HA-410 (3) | 450 | — | 90 | immiscible at room temperature |
| Difunctional PolyOxyEthylene/ Oxy Propylene Glycols | | | | |
| Pluronic L-31 (3) | 165 (@ 25° C.) | — | 90 | −30° C. to 40° C. |
| Pluronic L-42 (3) | 250 (@ 25° C.) | — | 90 | immiscible at room temp. and −60° C. miscible at −20° C., |

TABLE A-continued

| | Visc. @ 37° C. (Centistokes) | Mol Wt. | Wt % 134a | Miscibility Range |
|---|---|---|---|---|
| Pluronic L-81 (3) | 475 (@ 25° C.) | — | 90 | −30° C. immiscible at room temperature |
| Pluronic HTL-31 (3) | N/A | — | 90 | immiscible at room temperature |
| Pluronic 17R1 (3) | 300 (@ 25° C.) | — | 90 | immiscible at room temperature |
| Tetronic 701 (3) | 575 (@ 25° C.) | — | 90 | immiscible at room temperature |
| Difunctional Poly 1,2-OxyButylene/ Glycols | | | | |
| PBG 1800 (3) | 244 | 1800 | 85 | immiscible at room temperature |
| PBG 600 (3) | 69.4 | 600 | 85 | immiscible at room temperature |
| Trifunctional Glycols | | | | |
| TPF-740 (4) | 300 at 25° C. | 740 | 90 | miscible at room temp. and −20° C., −30° C. |
| TPF-740 (4) | 300 at 25° C. | 740 | 50 | miscible at room temp. and −20° C., −30° C. |

Source
(1) Union Carbide
(2) Dow Chemical
(3) BASF Wyandotte
(4) trimethylol propane initiated poly glycol supplied by BASF Wyandotte It will be seen that the difunctional polyoxypropylene glycols have a miscible range which is superior to those of the other types of glycols tested. Specifically, polyoxyethylene glycol was completely immiscible with R134a, while the mixed polymers were for the most part immiscible also. It was concluded that a mixed polymer should contain at least 80% oxypropylene units based on the total of the oxyethylene and oxypropylene units. Surprisingly, poly 1, 2 oxybutylene glycols were found to be immiscible and thus are not useful alone. Compared with the mono-hydroxy functional glycols the dual-hydroxyl functional glycols of the present invention have a wide range of miscibility making them uniquely suitable for lubricating refrigeration compressors using R134a.

The example of TPF-740 illustrates another aspect of the invention. While this materials is miscible to a significant extent in R134a it has a viscosity at 37° C. which is higher than is desirable. The glycol has three hydroxyl groups rather than two because of the initiation from trimethylol propane. Comparing the difunctional oxypropylene glycols in Table A it will be seen that the viscosity would be lower for a difunctional glycols having the molecular weight of TPF-740. Therefore it would be within the scope of this invention to formulate glycols which had at least two hydroxy groups with molecular weights which provided the desired viscosity. Another approach to achieve the needed balance of properties would be to blend available materials having two or more hydroxyl groups and different viscosities. For example, TPF-740 might be blended with NIAX 425 to provide a lubricant which is miscible with R134a and provides suitable viscosity.

EXAMPLE 2

(Comparative)

The tests described in Example 1 were carried out for mono hydroxy functional polyalkylene glycols which were mono ethers, with the results reported in Table B below.

TABLE B

| Fluid N—Butyl Ether Poly Oxy Propylene Glycol | Visc. @ 37° C. (Centistokes) | Mol Wt. | Wt % 134a | Miscibility Range |
|---|---|---|---|---|
| OL-285 (1) | 62 | — | 90 | −60° C. to over 54° C. |
| OL-285 | 62 | — | 50 | −60° C. to over 40° C. |
| OL-500 (1) | 110 | 1300 | 90 | immiscible at room temp. |
| OL-500 | 110 | 1300 | 50 | −30° C. to 43° C. |
| OL-525 (1) | 114 | 1400 | 90 | immiscible at room temp. and −60° C., miscible at 1° C., −20° C., −30° C. |
| OL-525 | 114 | 1400 | 75 | immiscible at room temp. and −60° C., miscible at 19° C., −20° C., −30° C. |
| OL-525 | 114 | 1400 | 65 | miscible at room temp. −20° C., −30° C., −60° C. |
| OL-525 | 114 | 1400 | 50 | miscible at room temp. −20° C., |

TABLE B-continued

| Fluid<br>N—Butyl Ether Poly<br>Oxy Propylene Glycol | Visc. @ 37° C.<br>(Centistokes) | Mol Wt. | Wt %<br>134a | Miscibility Range |
|---|---|---|---|---|
| LB-525 (2) | 114 | 1400 | 90 | −30° C., −60° C. immiscible at room temp. and −60° C., miscible at 8° C., −20° C., −30° C. |
| LB-525 | 114 | 1400 | 50 | miscible at room temp. and −20° C., −30° C., −60° C. |

Source
(1) Jefferson Chemical
(2) Union Carbide

It will be noted that many of the compositions tested were immiscible at room temperature. OL-285 has a reasonable range of miscibility with R134a but has a viscosity which is too low. Generally, a suitable mixture will contain about 80 to 99 wt. % R134a, thus many of the ether derivatives would not be suitable since they could separate within the operating temperature region for many refrigeration systems. LB-525, one of the glycols mentioned by DuPont in their Research Disclosure, would be expected to be immiscible in a typical automotive air conditioning system, which would operate between about 0° C. to 100° C.

EXAMPLE 3

(Comparative)

The tests described in Example 1 were repeated for other potential lubricants, which are not chemically related to the polyalkylene glycols. The results are reported in Table C below.

TABLE C

| Fluid | Class | Visc. @ 37° C. (Centistokes) | Wt % 134a | Miscibility Range |
|---|---|---|---|---|
| DC-200 (1) | Silicone | 100 | 90 | immiscible |
| F-50 | Silicone | 77 (at 25° C.) | 90 | immiscible |
| Anderol 500 (2) | Poly functional ester | 100 | 90 | immiscible |
| Selco SF-500 (3) | Poly functional ester | 100 | 90 | immiscible |
| DiTridecyl (4) phthalate | Poly functional ester | — | 90 | immiscible |
| Phosflex 179a (5) | Tricresyl phosphate | — | 90 | immiscible |

Source
(1) Dow Corning
(2) Tenneco Chemicals
(3) Synthetic Engineered Lubricants Co.
(4) United States Steel Chemicals Division
(5) Stauffer Chemical Co.

Although the examples above relate to selection of particular dual hydroxyl functional polyoxyalkylene glycols found to have a wider range of miscibility with R134a, it should be understood within the scope of the invention to blend such glycols with other materials for various purposes. Additives which may be used to enhance performance include (1) extreme pressure and antiwear additives, (2) oxidation and thermal stability improvers, (3) corrosion inhibitors, (4) viscosity index improvers, (5) pour and floc point depressants, (6) detergent, (7) anti foaming agents and (8) viscosity adjusters. Typical members of these classes include the following.

TABLE D

| Class Additive | Typical Members of the Class |
|---|---|
| 1. Extreme pressure and anti-wear | phosphates, phosphate esters (bicresyl phosphate), phosphites, thiophosphates (zinc diorganodithiophosphates) chlorinated waxes, sulfurized fats and olefins, organic lead compounds, fatty acids, molybdenum complexes, halogen substituted organosilicon compounds, borates, organic esters, halogen substituted phosphorous compounds, sulfurized Diels Alder adducts, organic sulfides, compounds containing chlorine and sulfur, metal salts of organic acids. |
| 2. Oxidation and thermal stability improvers | sterically hindered phenols (BHT), aromatic amines, dithiophosphates, phosphites, sulfides, metal salts of dithio acids. |
| 3. Corrosion Inhibitors | organic acids, organic amines, organic phosphates, organic alcohols, metal sulfonates, organic phosphites. |
| 4. Viscosity index improvers | polyisobutylene, polymethacrylate, polyalkylstyrenes. |
| 5. Pour Point and or floc point depressants | polymethacrylate ethylene - vinyl acetate copolymers, succinamic acid - olefin copolymers, ethylene - alpha olefin copolymers. Friedel-Crafts condensation products of wax with napthalene or phenols. |
| 6. Detergents | sulfonates, long-chain alkyl substituted aromatic sulfonic acids, phosphonates, thiophosphonates, phenolates, metal salts of alkyl phenols, alkyl sulfides, alkylphenolaldehyde condensation products, metal salts of substituted salicylates, N—substituted oliomers or polymers from the reaction products of unsaturated anhydrides and amines, compounds of the form where R' and R" are alkyl groups and X is oxygen or sulfur co-polymers of methacrylates with N—substituted compounds such as N—vinyl pyrrolidone or dimethylaminoethyl methacrylate, co-polymers which incorporate polyester linkages such as vinyl acetate-maleic anhydride co-polymers. |
| 7. Anti-Foaming Agents | silicone polymers |
| 8. Viscosity Adjusters | Polyisobutylene, polymethacrylates, polyalkylstyrenes, naphthenic oils. alkylbenzene oils, paraffinic oils, polyesters, polyvinylchloride, polyphosphates. |

Dihydroxyl glycols of varying molecular weights may be blended to provide improved viscosity or other important lubricating properties. For example, a glycol having a wide range of miscibility may have a viscosity which is lower than 10 cs and unable to provide needed lubrication alone. The glycol could be mixed with other compounds, such as poly hydroxy initiated polyoxyalkylene glycols such as TPF-740, a trimethylol propane initiated poly glycol, or PEP-450, a pentaerythritol initiated poly glycol. Other types of high viscosity substances could be added to a low molecular weight polyoxypropylene glycol to increase the viscosity provided that the resulting mixtures had a suitable range of miscibility with the refrigerant. For example, the NIAX 425 is shown in Table A to have a low viscosity but a wide miscibility range. It could be blended with higher molecular weight glycols (such as PPG-2000) to provide a higher viscosity while still retaining an acceptable miscibility range. Although not as inherently as desirable, mono-hydroxy functional glycols or other fluids might be blended with the dual-hydroxy functional glycols of the invention to the extent permitted by the desired miscibility range.

What is claimed is:

1. A composition for use in compression refrigeration comprising:
   (a) tetrafluoroethane; and
   (b) a sufficient amount to provide lubrication of at least one polyoxyalkylene glycol which is at least difunctional with respect to the hydroxyl groups, has a molecular weight between 300 and 2000, a viscosity of about 25–150 centistokes at 37° C., a viscosity index of at least 20 and miscible in combination with (a) in the range between −40° C. and at least +20° C.

2. The composition of claim 1 wherein said retrafluoroethane is 1,1,1,2-tetrafluoroethane.

3. The composition of claim 1 wherein said glycol is a blend of polyalkylene glycols having different molecular weights and hydroxyl functionalities.

4. The composition of claim 1 wherein said glycol is a polyoxpropylene glycol where the oxypropylene units are at least 80% of the total.

5. The composition of claim 1 wherein said glycol is polyoxypropylene glycol.

6. The composition of claim 1 wherein the miscible range is between −40° C. and at least +30° C.

7. The composition of claim 6 wherein the miscible range is between −40° C. and at least +40° C.

8. The composition of claim 7 wherein the miscible range is between −40° C. and at least +50° C.

9. The composition of claim 1 wherein the components (a) and (b) have the weight ratio of (a) to (b) of 99/1 to 1/99.

10. The composition of claim 1 further comprising (c) additives to enhance the performance of said composition selected from the group consisting of (1) extreme pressure and antiwear additives, (2) oxidation and thermal stability improvers, (3) corrosion inhibitors, (4) viscosity index improvers, (5) pour and floc point depressants, (6) detergents, (7) antifoaming agents, and (8) viscosity adjusters.

11. The composition of claim 1 wherein said glycol has a viscosity of about 3–24 centistokes at 98.9° C. and a viscosity index of at least 20.

12. The composition of claim 1 wherein the miscible range is between −30° C. and at least +20° C.

13. The composition of claim 1 wherein the miscible range is between −20° C. and at least +20° C.

14. A method for improving lubrication in compression refrigeration equipment using tetrafluoroethane as a refrigerant consisting of employing as a lubricant at least one polyalkylene glycol which is at least difunctional with respect to the hydroxyl groups has, a molecular weight between 300 and 2000, a viscosity of about 25–150 centistokes at 37° C., a viscosity index of at least 20 and a miscible range in combination with tetrafluoroethane between −40° C. and at least +20° C.

15. The method of claim 14 wherein said tetrafluoroethane is 1,1,1,2-tetrafluoroethane.

16. The method of claim 14 wherein said lubricant comprises a blend of polyalkylene glycols having different molecular weights and hydroxy functionalities.

17. The method of claim 14 wherein said glycol is a polyoxypropylene glycol where the oxypropylene units are at least 80% of the total.

18. The method of claim 14 wherein said glycol is polyoxypropylene glycol.

19. The method of claim 14 wherein the miscible range is between −40° C. and at least +30° C.

20. The method of claim 19 wherein the miscible range is between −40° C. and at least +40° C.

21. The method of claim 20 wherein the miscible range is between −40° C. and at least +50° C.

22. The method of claim 14 wherein said glycol has a viscosity of about 3–24 centistokes at 98.9° C. and a viscosity index of at least 20.

23. The method of claim 14 wherein the miscible range is between −30° C. and at least +20° C.

24. The method of claim 14 wherein the miscible range is between −20° C. and at least +20° C.

* * * * *

UNITED STATES PATENT AND TRADEMARK OFFICE
CERTIFICATE OF CORRECTION

PATENT NO. : 4,755,316
DATED : July 5, 1988
INVENTOR(S) : H. Magid et al.

It is certified that error appears in the above-identified patent and that said Letters Patent are hereby corrected as shown below:

In the Claims

Claim 2, line 1,
    delete "retra-"; subsititute therefor -- tetra --.

Claim 4, line 2,
    delete "polyoxpropylene"; substitute therefor --
    polyoxypropylene --.

Claim 14, line 5,
    delete "has,"; substitute therefor -- , has --.

Signed and Sealed this

Sixth Day of December, 1988

*Attest:*

DONALD J. QUIGG

*Attesting Officer*       *Commissioner of Patents and Trademarks*